United States Patent
Masugi

(10) Patent No.: US 9,563,043 B2
(45) Date of Patent: Feb. 7, 2017

(54) ZOOM LENS, OPTICAL APPARATUS AND METHOD FOR MANUFACTURING THE ZOOM LENS

(71) Applicant: NIKON CORPORATION, Chiyoda-ku, Tokyo (JP)

(72) Inventor: Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/604,695

(22) Filed: Jan. 24, 2015

(65) Prior Publication Data

US 2015/0241672 A1    Aug. 27, 2015

Related U.S. Application Data

(63) Continuation of application No. PCT/JP2013/004029, filed on Jun. 28, 2013.

(30) Foreign Application Priority Data

Jul. 26, 2012   (JP) ................. 2012-165554

(51) Int. Cl.
  *G02B 15/14*     (2006.01)
  *G02B 15/167*    (2006.01)
  (Continued)

(52) U.S. Cl.
  CPC ............ *G02B 15/167* (2013.01); *G02B 7/021* (2013.01); *G02B 9/64* (2013.01); *G02B 13/18* (2013.01);
  (Continued)

(58) Field of Classification Search
  CPC .......... G02B 15/173; G02B 15/14; G03B 5/00
  (Continued)

(56) References Cited

U.S. PATENT DOCUMENTS 7,535,654 B2   5/2009   Ohashi
7,663,808 B2   2/2010   Ohashi
(Continued)

FOREIGN PATENT DOCUMENTS

JP   2008-26837 A   2/2008
JP   2008-96924 A   4/2008
(Continued)

OTHER PUBLICATIONS

International Search Report from International Patent Application No. PCT/JP2013/004029, Sep. 10, 2013.

*Primary Examiner* — Mahidere Sahle
(74) *Attorney, Agent, or Firm* — Shapiro, Gabor and Rosenberger, PLLC

(57) ABSTRACT

The present invention has, in order along the optical axis from the object side: a first lens group (G1) that has positive refractive power; a second lens group (G2) that has negative refractive power; a third lens group (G3) that has positive refractive power; a fourth lens group (G4) that has positive refractive power; and a fifth lens group (G5). The fourth lens group (G4) is constituted by a single positive lens (L41), and the fifth lens group (G5) is constituted by a single lens (L51), which is fixed with respect to an image plane while power is being varied. The following conditional expression (1) is satisfied. $0.9 < \beta2t \cdot \beta3w/(\beta2w \cdot \beta3t) < 1.7$ . . . (1), where $\beta2w$ denotes a magnification of the second lens group (G2) in the wide-angle end state, $\beta3w$ denotes a magnification of the third lens group (G3) in the wide-angle end state, $\beta2t$ denotes a magnification of the second lens group (G2) in the telephoto end state, and $\beta3t$ denotes a magnification of the third lens group (G3) in the telephoto end state.

11 Claims, 11 Drawing Sheets

(51) Int. Cl.
  *G02B 15/173* (2006.01)
  *G02B 7/02* (2006.01)
  *G02B 9/64* (2006.01)
  *G02B 13/18* (2006.01)
  *G02B 15/20* (2006.01)
  *G02B 27/00* (2006.01)

(52) U.S. Cl.
  CPC .............. *G02B 15/173* (2013.01); *G02B 15/20* (2013.01); *G02B 27/0025* (2013.01)

(58) Field of Classification Search
  USPC .................................................. 359/642–830
  See application file for complete search history.

(56) References Cited

U.S. PATENT DOCUMENTS

| | | | |
|---|---|---|---|
| 7,782,543 B2 | 8/2010 | Fujisaki | |
| 7,907,349 B2 | 3/2011 | Katakura | |
| 8,203,799 B2 | 6/2012 | Mihara et al. | |
| 8,472,124 B2 | 6/2013 | Mihara | |
| 2007/0297068 A1 | 12/2007 | Ohashi | |
| 2008/0100923 A1* | 5/2008 | Morooka | G02B 15/173 359/687 |
| 2009/0091841 A1 | 4/2009 | Ohashi | |
| 2010/0007966 A1 | 1/2010 | Katakura | |
| 2010/0033839 A1 | 2/2010 | Fujisaki | |
| 2010/0134901 A1* | 6/2010 | Kimura | G02B 15/173 359/687 |
| 2010/0238564 A1 | 9/2010 | Kubota et al. | |
| 2010/0245786 A1* | 9/2010 | Sado | G02B 15/177 353/101 |
| 2010/0271710 A1 | 10/2010 | Ohashi | |
| 2011/0102660 A1 | 5/2011 | Mihara et al. | |
| 2011/0267504 A1 | 11/2011 | Ichikawa | |
| 2011/0285896 A1 | 11/2011 | Mihara | |
| 2013/0050567 A1 | 2/2013 | Kubota et al. | |

FOREIGN PATENT DOCUMENTS

| | | |
|---|---|---|
| JP | 2009-93118 A | 4/2009 |
| JP | 2010-19959 A | 1/2010 |
| JP | 2010-39429 A | 2/2010 |
| JP | 2010-217478 A | 9/2010 |
| JP | 2011-95488 A | 5/2011 |
| JP | 2011-170054 A | 9/2011 |
| JP | 2011-232620 A | 11/2011 |
| JP | 2011-247949 A | 12/2011 |
| JP | 2012-78788 A | 4/2012 |

* cited by examiner

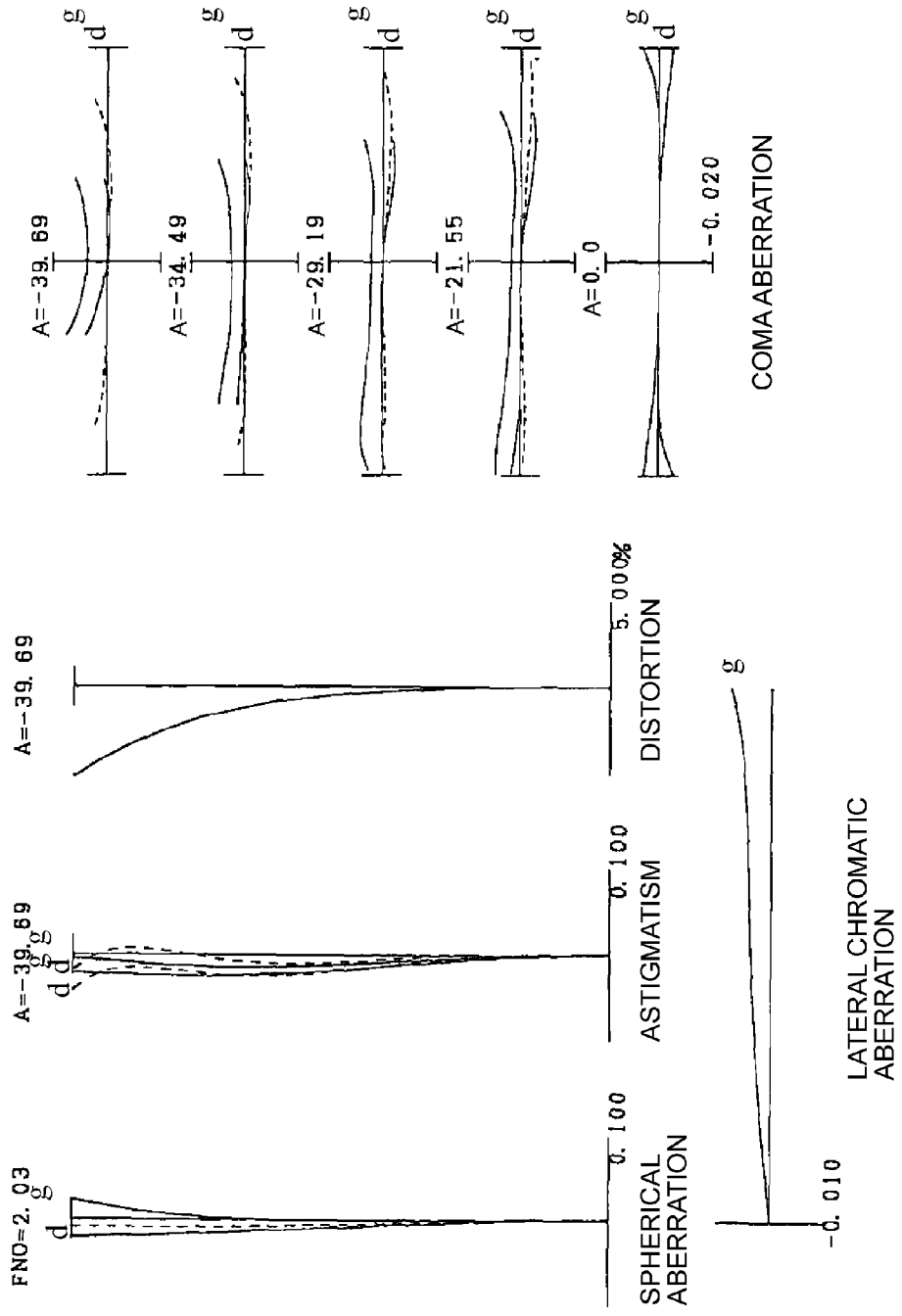

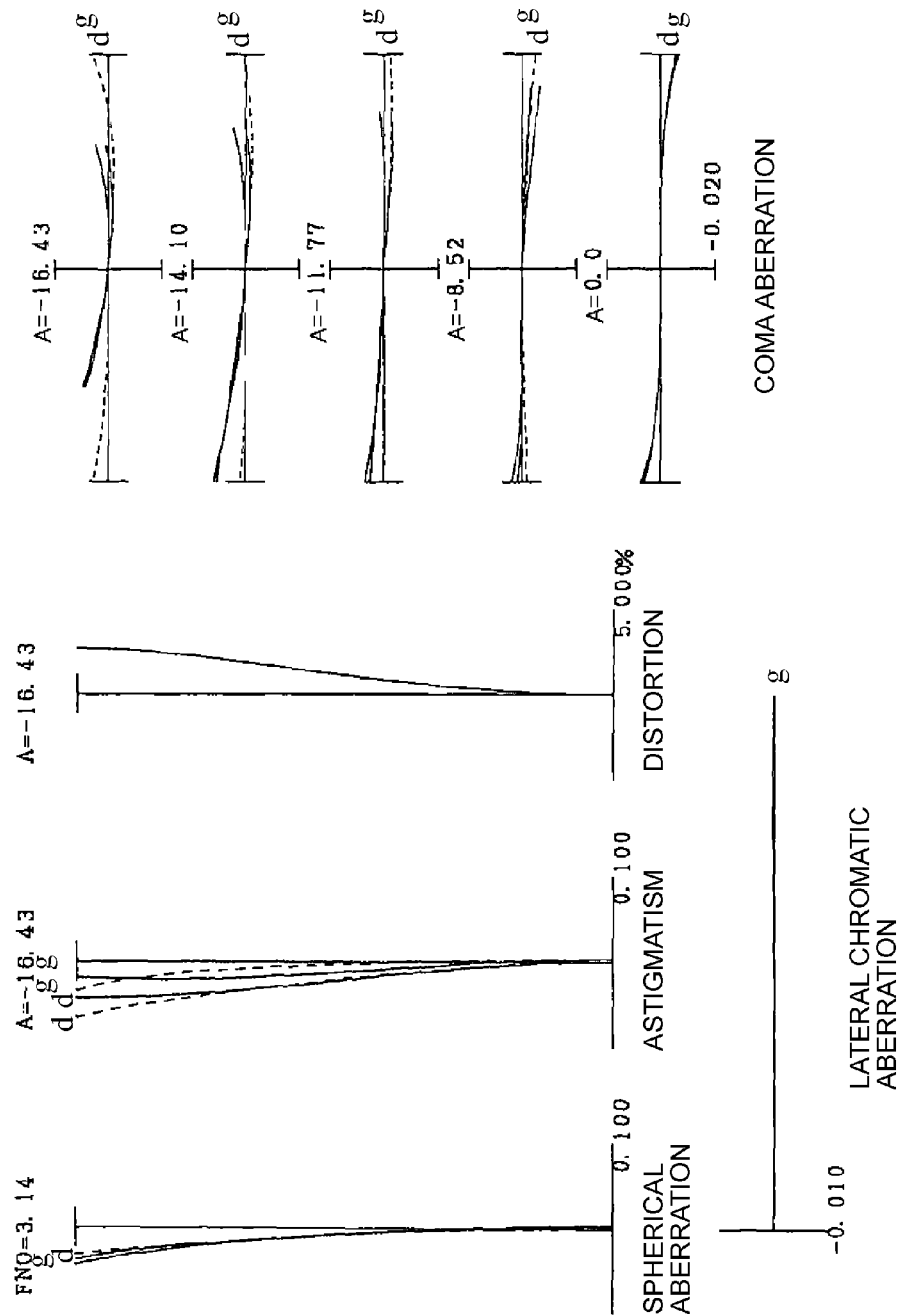

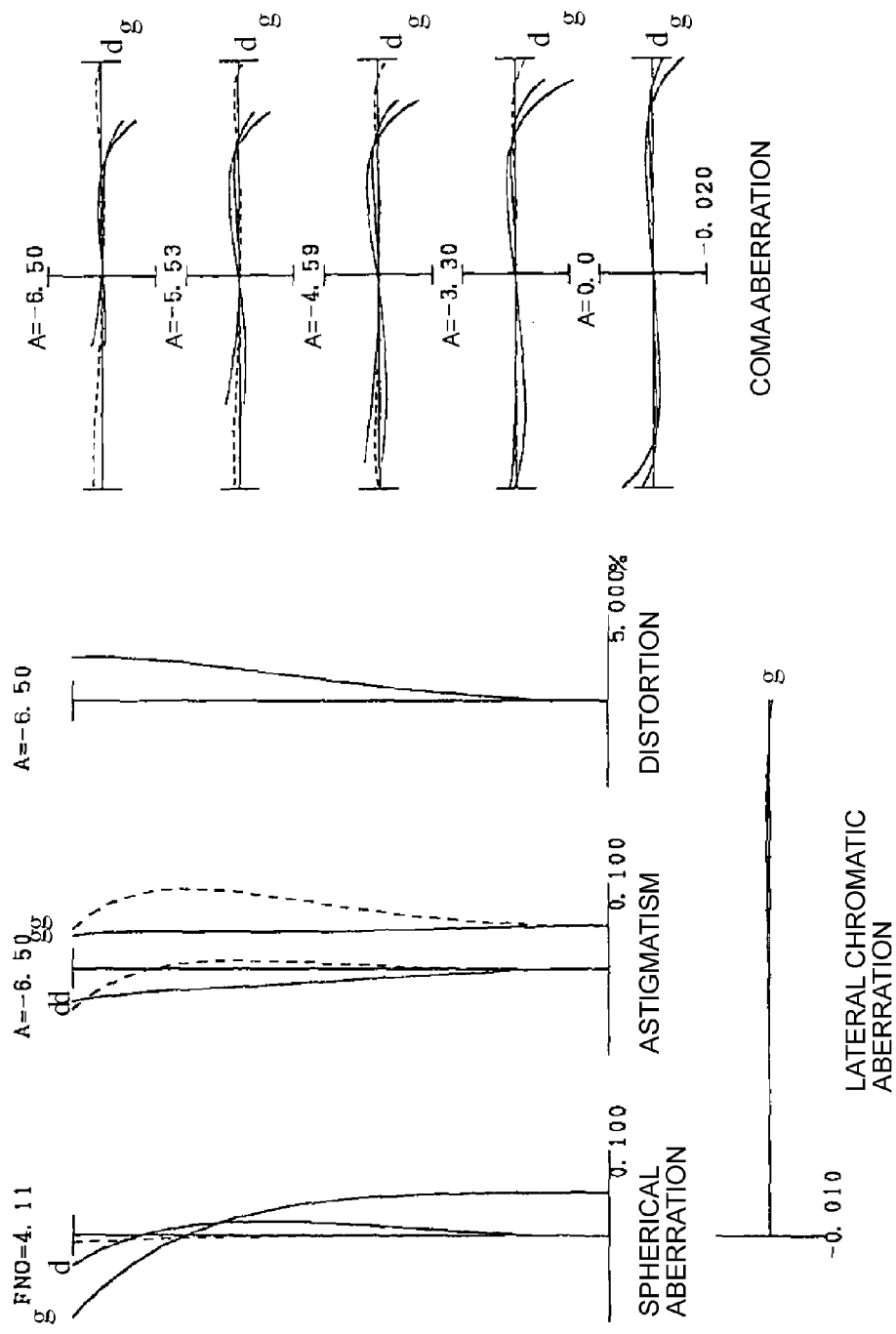

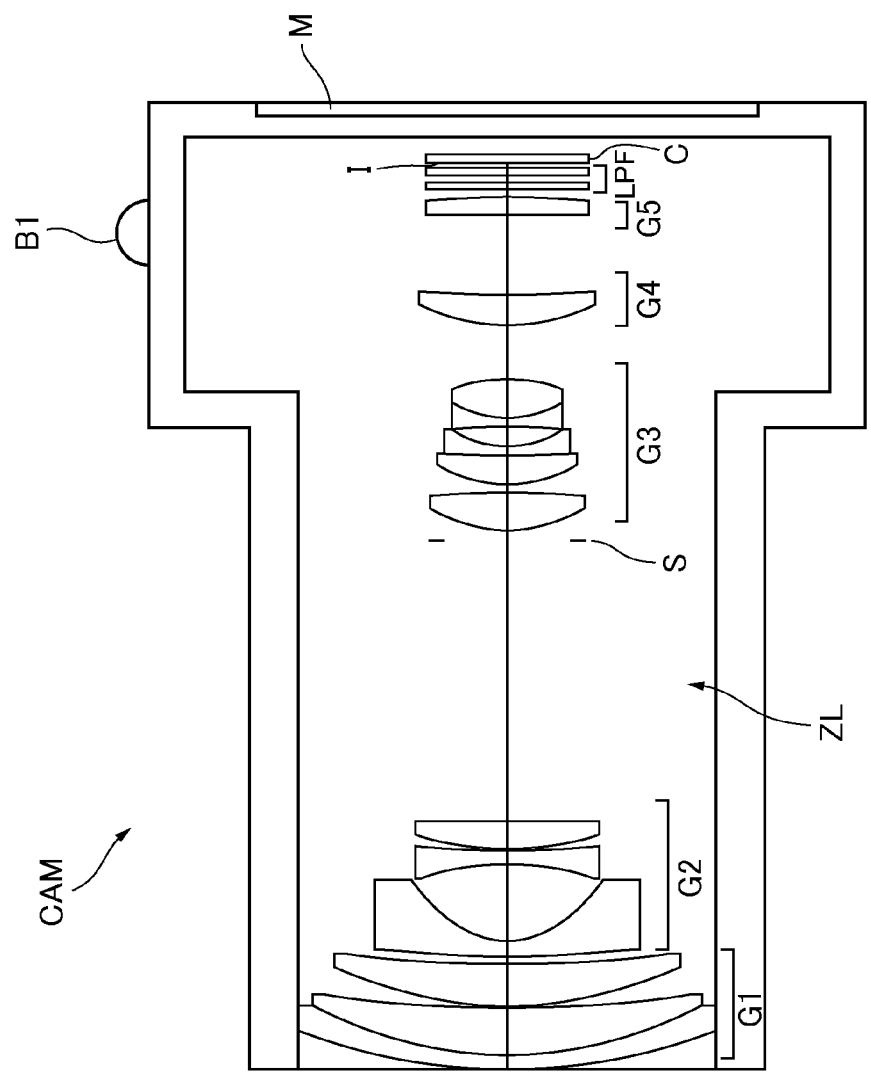

ZOOM LENS, OPTICAL APPARATUS AND METHOD FOR MANUFACTURING THE ZOOM LENS

This is a continuation of PCT International Application No. PCT/JP2013/004029, filed on Jun. 28, 2013, which is hereby incorporated by reference. This application also claims the benefit of Japanese Patent Application No. 2012-165554, filed in Japan on Jul. 26, 2012, which is hereby incorporated by reference.

TECHNICAL FIELD

The present invention relates to a zoom lens, an optical apparatus, and a method for manufacturing the zoom lens.

BACKGROUND ART

Conventionally, a zoom lens has been proposed as a zoom lens with a high zoom ratio comprising, in order from an object along the optical axis, a first lens group having positive refractive power, a second lens group having negative refractive power, a third lens group having positive refractive power, and a fourth lens group having positive refractive power, wherein zooming is performed by moving the lens groups. (For example, see the patent document below.)

PRIOR ARTS LIST

Patent Document

Japanese Unexamined Patent Application Publication No. 2010-217478A

SUMMARY OF THE INVENTION

Technical Problem

Although brightness is ensured in the conventional zoom lens, the zoom ratio is considered to be insufficient.

With the foregoing in view, it is an object of the present invention to provide a zoom lens and an optical apparatus, which are bright, have a high zoom ratio, and provide a high quality image, and a method for manufacturing the zoom lens.

Solution to Problem

In order to achieve this object, a zoom lens according to the present invention is a zoom lens comprising, in order from an object along the optical axis, a first lens group having positive refractive power, a second lens group having negative refractive power, a third lens group having positive refractive power, a fourth lens group having positive refractive power, and a fifth lens group, wherein the fourth lens group is constituted by one positive lens, the fifth lens group is constituted by one lens fixed with respect to the image plane during zooming, and the following conditional expression is satisfied:

$$0.9 < \beta 2t \cdot \beta 3w/(\beta 2w \cdot \beta 3t) < 1.7$$

where

β2w denotes a magnification of the second lens group in the wide-angle end state, β3w denotes a magnification of the third lens group in the wide-angle end state, β2t denotes a magnification of the second lens group in the telephoto end state, and β3t denotes a magnification of the third lens group in the telephoto end state.

In a zoom lens according to the present invention, it is preferable that the following conditional expression is satisfied:

$$4.0 < \beta 2t \cdot \beta 3t/(\beta 2w \cdot \beta 3w) < 10.0$$

In the zoom lens according to the present invention, it is preferable that the third lens group comprises, in order from an object along the optical axis, a single lens having positive refractive power, a first cemented lens having negative refractive power, and a second cemented lens.

In the zoom lens according to the present invention, it is preferable that the following conditional expression is satisfied:

$$-0.4 < f3/f3L < 0.4$$

where f3 denotes a focal length of the third lens group, and f3L denotes a focal length of the second cemented lens constituting the third lens group.

In the zoom lens according to the present invention, it is preferable that the following conditional expression is satisfied:

$$0.0 < (R2+R1)/(R2-R1) < 1.5$$

where

R1 denotes a radius of curvature of the lens surface closest to an image in the first cemented lens constituting the third lens group, and R2 denotes a radius of curvature of the lens surface closest to an object in the second cemented lens constituting the third lens group.

In the zoom lens according to the present invention, it is preferable that the second lens group comprises, in order from an object, a first negative lens and a second negative lens, and the following conditional expression is satisfied:

$$1.2 < f22/f21 < 5.0$$

where f21 denotes a focal length of the first negative lens constituting the second lens group, and f22 denotes a focal length of the second negative lens constituting the second lens group.

In the zoom lens according to the present invention, it is preferable that the following conditional expression is satisfied:

$$0.85 < \beta 5 < 1.15$$

where

β5 denotes a magnification of the fifth lens group.

In the zoom lens according to the present invention, it is preferable that the fifth lens group is constituted by a plastic lens.

In the zoom lens according to the present invention, it is preferable, upon zooming from the wide-angle end state to the telephoto end state, that the first lens group moves so as to be closer to the object in the telephoto end state than the wide-angle end state, the second lens group moves with a convex locus toward the image, the third lens group moves toward the object, and the fourth lens group moves with a convex locus toward the object.

An optical apparatus according to the present invention comprises any zoom lens described above.

A method for manufacturing a zoom lens according to the present invention is a method for manufacturing a zoom lens comprising, in order from an object along the optical axis, a first lens group having positive refractive power, a second lens group having negative refractive power, a third lens group having positive refractive power, a fourth lens group having positive refractive power, and a fifth lens group, wherein each lens is assembled in a lens barrel so that: the fourth lens group is constituted by one positive lens; the fifth lens group is constituted by of one lens fixed with respect to the image plane during zooming; and the following conditional expression is satisfied:

$$0.9<\beta 2t\cdot\beta 3w/(\beta 2w\cdot\beta 3t)<1.7$$

where $\beta 2w$ denotes a magnification of the second lens group in the wide-angle end state, $\beta 3w$ denotes a magnification of the third lens group in the wide-angle end state, $\beta 2t$ denotes a magnification of the second lens group in the telephoto end state, and $\beta 3t$ denotes a magnification of the third lens group in the telephoto end state.

Advantageous Effects of the Invention

According to the present invention, a zoom lens, which is bright, has a high zoom ratio, and provides a high quality image, an optical apparatus, and a method for manufacturing the zoom lens can be provided.

BRIEF DESCRIPTION OF THE DRAWINGS

FIGS. 2A to 2C are graphs showing various aberrations of the zoom lens according to Example 1, where FIG. 2A shows graphs showing various aberrations of the zoom lens upon focusing on infinity in the wide-angle end state, FIG. 2B shows graphs showing various aberrations of the zoom lens upon focusing on infinity in the intermediate focal length state, and FIG. 2C shows graphs showing various aberrations of the zoom lens upon focusing on infinity in the telephoto end state;

FIG. 4A shows graphs showing various aberrations of the zoom lens upon focusing on infinity in the wide-angle end state, FIG. 4B shows graphs showing various aberrations of the zoom lens upon focusing on infinity in the intermediate focal length state, and FIG. 4C shows graphs showing various aberrations of the zoom lens upon focusing on infinity in the telephoto end state;

FIG. 5A is a front view, and FIG. 5B is a rear view;

FIG. 6 is a cross-sectional view along the A-A' line in FIG. 5A;

DESCRIPTION OF THE EMBODIMENTS

Figure 1:
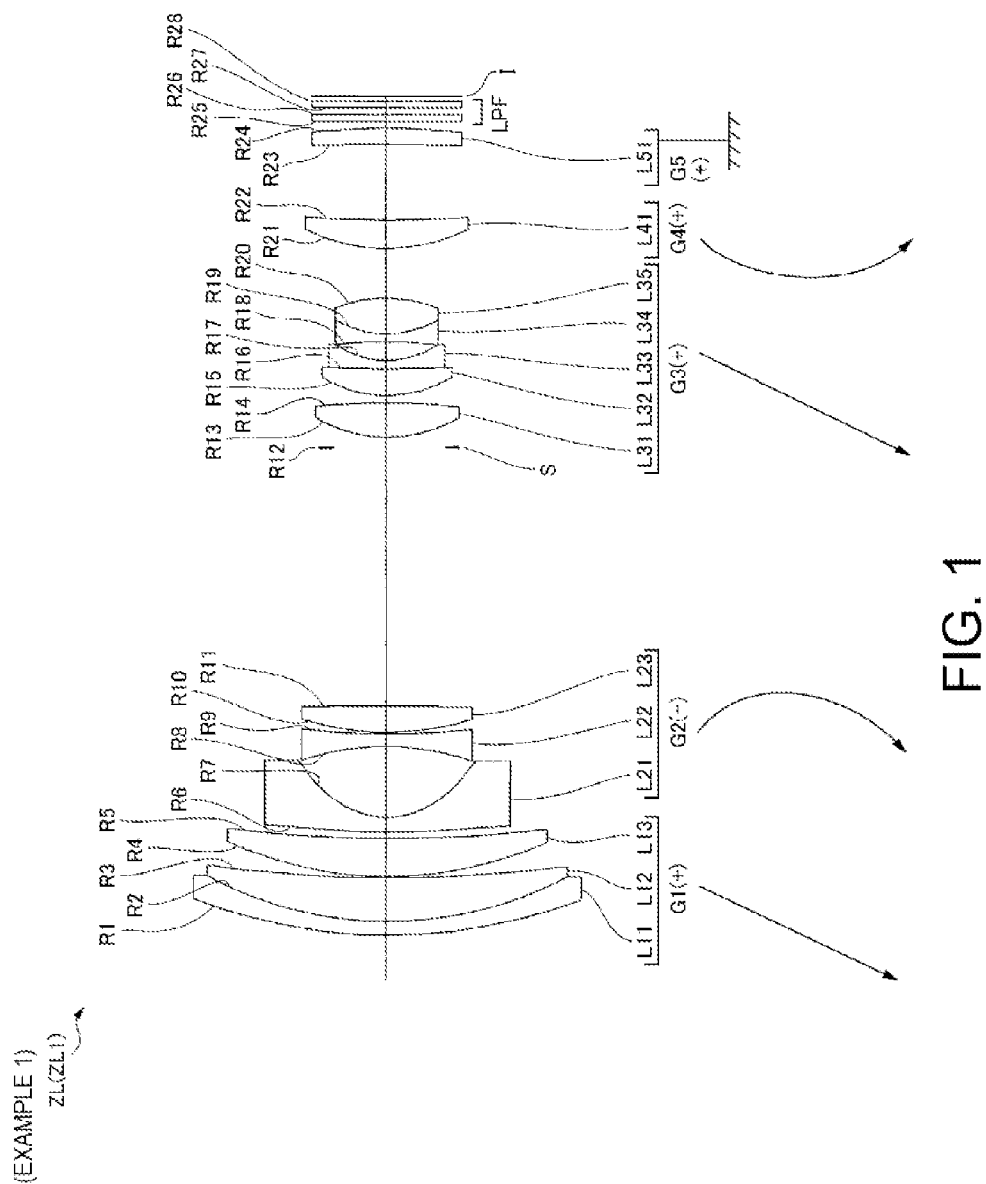
FIG. 1 is a diagram depicting a lens configuration according to Example 1, and a movement locus from a wide-angle end state to a telephoto end state.

Embodiments will now be described with reference to the drawings. As FIG. 1 shows, a zoom lens ZL according to the present embodiment is a zoom lens comprising, in order from an object along the optical axis, a first lens group G1 having positive refractive power, a second lens group G2 having negative refractive power, a third lens group G3 having positive refractive power, a fourth lens group G4 having positive refractive power, and a fifth lens group G5, wherein the fourth lens group G4 is constituted by one positive lens L41, and the fifth lens group G5 is constituted by one lens L51 fixed with respect to an image plane I during zooming. With this configuration, a high zoom ratio becomes possible without increasing the overall size of the lens while still maintaining the astigmatism.

In addition, the zoom lens ZL according to the present embodiment, based on the above configuration, is constituted to satisfy the following conditional expression (1):

$$0.9<\beta 2t\cdot\beta 3w/(\beta 2w\cdot\beta 3t)<1.7 \quad (1)$$

where $\beta 2w$ denotes a magnification of the second lens group G2 in the wide-angle end state, $\beta 3w$ denotes a magnification of the third lens group G3 in the wide-angle end state, $\beta 2t$ denotes a magnification of the second lens group G2 in the telephoto end state, and $\beta 3t$ denotes a magnification of the third lens group G3 in the telephoto end state.

The conditional expression (1) specifies a ratio for an appropriate change in magnification between the second lens group G2 and the third lens group G3 upon zooming from the wide-angle end state to the telephoto end state. If the lower limit value of the conditional expression (1) is not reached, the coma aberration worsens, which is not desirable. Similarly, if the upper limit value of the conditional expression (1) is exceeded, the coma aberration worsens, which is not desirable.

To better ensure the effect of the present embodiment, it is preferable that the lower limit value of the conditional expression (1) is 1.0. To better ensure the effect of the present embodiment, it is preferable that the upper limit value of the conditional expression (1) is 1.5.

In the zoom lens ZL according to the present embodiment, it is preferable that the following conditional expression (2) is satisfied:

$$4.0<\beta 2t\cdot\beta 3t/(\beta 2w\cdot\beta 3w)<10.0 \quad (2)$$

The conditional expression (2) specifies a product for an appropriate change in magnification between the second lens group G2 and the third lens group G3 upon zooming from the wide-angle end state to the telephoto end state. If the lower limit value of the conditional expression (2) is not reached, the coma aberration worsens, which is not desirable. Similarly, if the upper limit value of the conditional expression (2) is exceeded, the coma aberration worsens, which is not desirable.

To better ensure the effect of the present embodiment, it is preferable that the lower limit value of the conditional expression (2) is 5.0. To better ensure the effect of the present embodiment, it is preferable that the upper limit value of the conditional expression (2) is 8.5.

In the zoom lens ZL according to the present embodiment, it is preferable that the third lens group G3 comprises, in order from the object along the optical axis, a single lens having positive refractive power, a first cemented lens having negative refractive power, and a second cemented lens. With this configuration, spherical aberration can be efficiently corrected. Further, it becomes easier to make the aperture larger.

In the zoom lens ZL according to the present embodiment, it is preferable that the following conditional expression (3) is satisfied:

$$-0.4 < f3/f3L < 0.4 \tag{3}$$

where f3 denotes a focal length of the third lens group G3, and f3L denotes a focal length of the second cemented lens constituting the third lens group G3.

The conditional expression (3) specifies an appropriate focal length ratio between the second cemented lens constituting the third lens group G3 and the third lens group G3. If the lower limit value of the conditional expression (3) is not reached, the spherical aberration and coma aberration worsen, which is not desirable. If the upper limit value of the conditional expression (3) is exceeded, the size of the entire optical system increases and fluctuation of coma aberration and astigmatism due to manufacturing error increases, which is not desirable.

To better ensure the effect of the present embodiment, it is preferable that the lower limit value of the conditional expression (3) is −0.3. To better ensure the effect of the present embodiment, it is preferable that the upper limit value of the conditional expression (3) is 0.3.

In the zoom lens ZL according to the present embodiment, it is preferable that the following conditional expression (4) is satisfied:

$$0.0 < (R2+R1)/(R2-R1) < 1.5 \tag{4}$$

where

R1 denotes a radius of curvature of the lens surface closest to the image in the first cemented lens constituting the third lens group G3, and R2 denotes a radius of curvature of the lens surface closest to the object in the second cemented lens constituting the third lens group G3.

The conditional expression (4) specifies a preferred shape for an air lens formed between the two cemented lenses constituting the third lens group G3, i.e. between the first cemented lens and the second cemented lens. If the lower limit value of the conditional expression (4) is not reached, the coma aberration and spherical aberration worsen, which is not desirable. Similarly, if the upper limit value of the conditional expression (4) is exceeded, the coma aberration and spherical aberration worsen, which is not desirable.

To better ensure the effect of the present embodiment, it is preferable that the lower limit value of the conditional expression (4) is 0.4. To better ensure the effect of the present embodiment, it is preferable that the upper limit value of the conditional expression (4) is 1.2.

In the zoom lens ZL according to the present embodiment, it is preferable that the second lens group G2 comprises, in order from the object, a first negative lens and a second negative lens, and the following conditional expression (5) is satisfied:

$$1.2 < f22/f21 < 5.0 \tag{5}$$

where f21 denotes a focal length of the first negative lens constituting the second lens group G2, and f22 denotes a focal length of the second negative lens constituting the second lens group G2.

The conditional expression (5) specifies an appropriate focal length ratio between the two negative lenses constituting the second lens group G2, i.e. the first negative lens and the second negative lens. If the lower limit value of the conditional expression (5) is not reached, the coma aberration and spherical aberration worsen, which is not desirable. Similarly, if the upper limit value of the conditional expression (5) is exceeded, the coma aberration and spherical aberration worsen, which is not desirable.

To better ensure the effect of the present embodiment, it is preferable that the lower limit value of the conditional expression (5) is 1.5. To better ensure the effect of the present embodiment, it is preferable that the upper limit value of the conditional expression (5) is 4.5.

In the zoom lens ZL according to the present embodiment, it is preferable that the following conditional expression (6) is satisfied:

$$0.85 < \beta5 < 1.15 \tag{6}$$

where

β5 denotes a magnification of the fifth lens group G5.

The conditional expression (6) specifies an appropriate magnification of the fifth lens group G5. If the lower limit value of the conditional expression (6) is not reached, the size of the optical system increases and curvature of field worsens, which is not desirable. Similarly, if the upper limit value of the conditional expression (6) is exceeded, the size of the optical system increases and curvature of field worsens, which is not desirable.

To better ensure the effect of the present embodiment, it is preferable that the lower limit value of the conditional expression (6) is 0.90. To better ensure the effect of the present embodiment, it is preferable that the upper limit value of the conditional expression (6) is 1.10.

In the zoom lens ZL according to the present embodiment, it is preferable that the fifth lens group G5 is constituted by a plastic lens. Although fluctuation in various characteristics due to temperature change is generally problematic in a plastic lens, in the zoom lens ZL according to the present embodiment, change in characteristics due to temperature change can be substantially ignored because the plastic lens is used for the fifth lens group G5 located near the image plane I. Therefore, from a perspective of manufacturing costs, it is more preferable that a plastic lens is used for the fifth lens group G5.

In the zoom lens ZL according to the present embodiment, it is preferable, upon zooming from the wide-angle end state to the telephoto end state, that the first lens group G1 moves so as to be closer to the object in the telephoto end state than the wide-angle end state. At such time, the first lens group G1 may move monotonically toward the object or it may move toward the image with a convex locus. It is preferable that the second lens group G2 moves toward the image with a convex locus. It is preferable that the third lens group G3 moves monotonically toward the object. It is preferable that the fourth lens group G4 moves toward the object with a convex locus. Because of this configuration, fluctuation in various aberrations such as spherical aberration upon zooming can be kept small, the movement amount of each lens group can be prevented from getting too large, and the size of the entire lens can be made small.

Figure 5A:
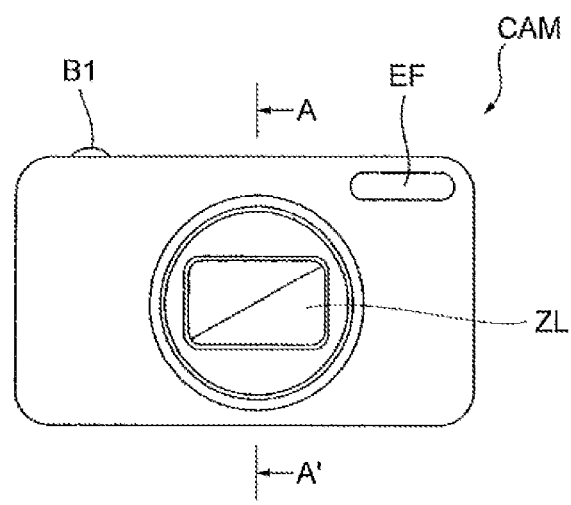
FIGS. 5A and 5B are diagrams depicting a digital camera (optical apparatus) having the zoom lens according to the present embodiment installed therein.
Figure 5B:
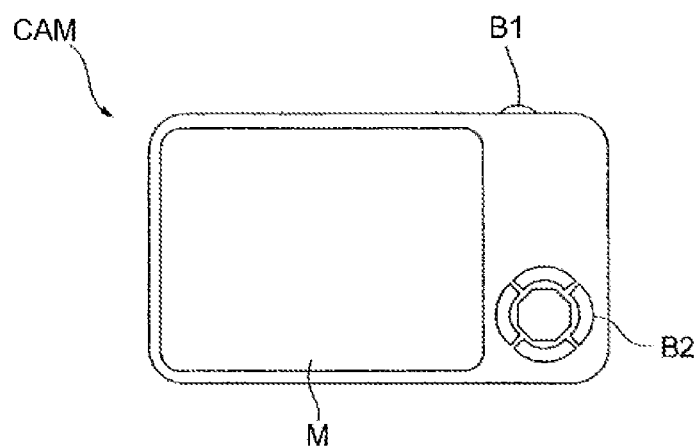

FIG. 5 and FIG. 6 show a configuration of a digital still camera CAM (optical apparatus) as an optical apparatus that is provided with the aforementioned zoom lens ZL as an image capturing lens. If a power button (not illustrated) is pressed on the digital still camera CAM, a shutter (not illustrated) of the image capturing lens (zoom lens ZL) is released, and lights from an object are collected by the zoom lens ZL and form an image on a picture element C (e.g. CCD and CMOS), which is disposed on the image plane I (e.g. see FIG. 1). The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element C, and stores it in memory (not illustrated). Further, the digital still camera CAM is disposed with an auxiliary light emitting unit EF, which emits auxiliary light when the object is dark, a function button B2, which is used for setting various conditions for the digital still camera CAM, and the like.

A compact type camera has been illustrated here in which the camera CAM and the zoom lens ZL are integrally formed, but the optical apparatus may also be a single-lens reflex camera in which the lens barrel having the zoom lens ZL is removable from the camera main body.

According to the camera CAM with the above configuration, a camera, which is bright, has a high zoom ratio, and provides a high quality image, can be realized by installing the zoom lens ZL according to the present embodiment as the image capturing lens.

Figure 7:
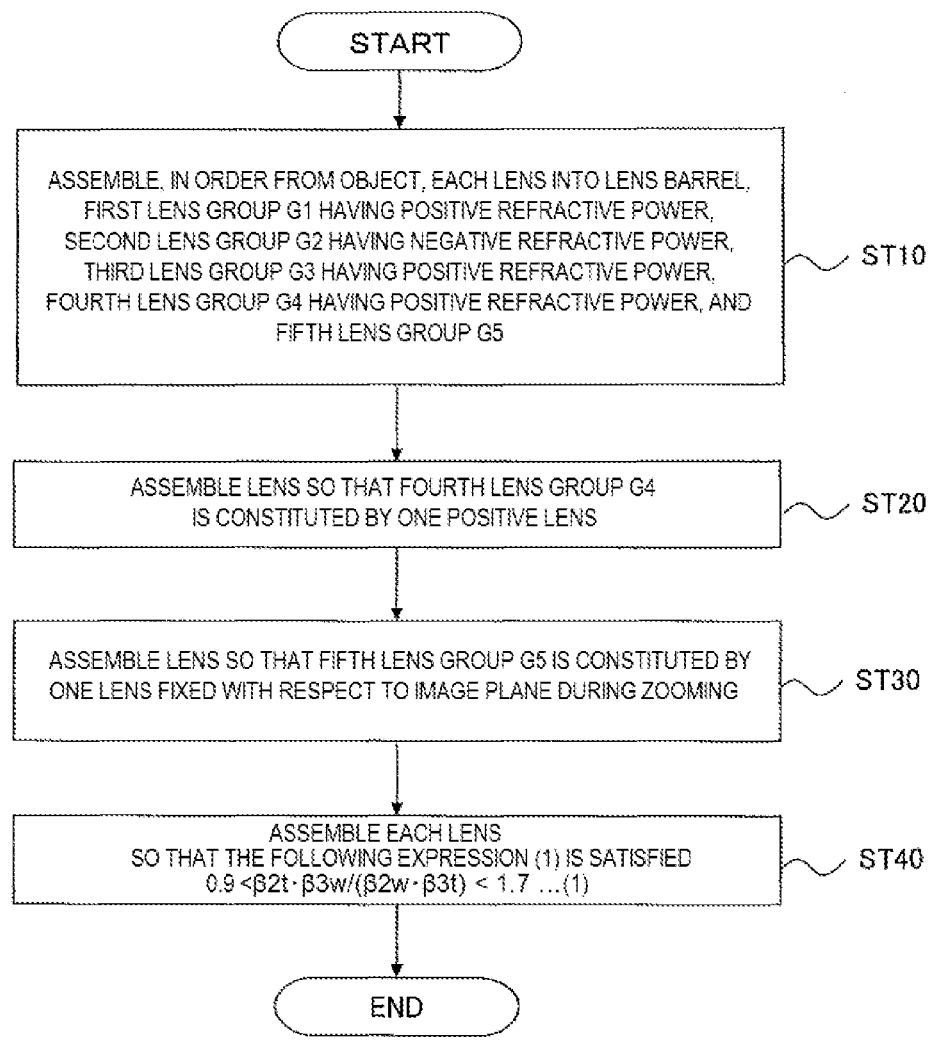
FIG. 7 is a flow chart depicting the method for manufacturing the zoom lens according to the present embodiment.

A method for manufacturing the above zoom lens ZL will now be described with reference to FIG. 7. First, the first lens group G1 having positive refractive power, the second lens group G2 having negative refractive power, the third lens group G3 having positive refractive power, the fourth lens group G4 having positive refractive power, and the fifth lens group G5 are assembled in order from the object (step ST10). At this time, the one positive lens L41 is assembled as the fourth lens group G4 (step ST20). Further, the one lens L51 is assembled as the fifth lens group G5 fixed with respect to the image plane I during zooming (step ST30). In addition, each lens is assembled in the lens barrel so as to satisfy the following conditional expression (1) (step ST40):

$$0.9 < \beta 2t \cdot \beta 3w / (\beta 2w \cdot \beta 3t) < 1.7 \tag{1}$$

where $\beta 2w$ denotes a magnification of the second lens group G2 in the wide-angle end state, $\beta 3w$ denotes a magnification of the third lens group G2 in the wide-angle end state, $\beta 2t$ denotes a magnification of the second lens group G3 in the telephoto end state, and $\beta 3t$ denotes a magnification of the third lens group G3 in the telephoto end state.

One example of lens disposition in the present embodiment, as FIG. 1 shows, includes the zoom lens ZL, in which the first lens group G1 has, in order from the object along the optical axis, a cemented lens of a negative meniscus lens L11 having a concave surface facing the image, and a positive meniscus lens L12 having a convex surface facing the object, and a positive meniscus lens L13 having a convex surface facing the object so as to have positive refractive power as a whole. The second lens group G2 has, in order from the object along the optical axis, a negative meniscus lens L21 having a concave surface facing the image, a negative biconcave lens L22, and a positive biconvex lens L23 so as to have negative refractive power as a whole. The third lens group G3 has, in order from the object along the optical axis, a positive biconvex lens L31, a cemented lens of a positive meniscus lens L32 having a convex surface facing the object and a negative meniscus lens L33 having a concave surface facing the image, and a cemented lens of a negative biconcave lens L34 and a positive biconvex lens L35 so as to have positive refractive power as a whole. The fourth lens group G4 has a positive meniscus lens L41 having a convex surface facing the object so as to have positive refractive power as a whole. The fifth lens group G5 has a positive meniscus lens L51 having a concave surface facing the object so as to have positive refractive power as a whole. Note that each lens is assembled so that the value corresponding to the conditional expression (1) becomes 1.18.

According to the method for manufacturing described above, the zoom lens ZL, which is bright, has a high zoom ratio, and provides a high quality image, can be obtained.

EXAMPLES

Examples according to the present embodiment will now be described with reference to the drawings. Tables 1 and 2 shown below list each data according to Examples 1 and 2.

Note that, the reference numerals in FIG. 1 according to Example 1 will be used independently in each example in order to prevent description from being complicated due to an increase in the number of digits of the reference numerals. Therefore, even if a common reference numeral is used in a drawing according to other example, this does not necessarily indicate a common configuration with the other example.

In each example, d-line (wavelength=587.5620 nm) and g-line (wavelength=435.8350 nm) are selected as the calculation targets for aberration characteristics.

In [Lens Data] in each table, the surface number is a number of the optical surface counted from the object along the traveling direction of rays, R is a radius of curvature of each optical surface, D is a surface distance, which is a distance from each optical surface to the next optical surface (or image plane) on the optical axis, nd is a refractive index at the d-line of the material of the optical element, and vd is an Abbe number based on the d-line of the material of the optical element. Object surface is a surface of an object, (Variable) is a variable surface distance, "∞" of the radius of curvature is a plane or an aperture, (Stop S) is an aperture stop S, and image plane is an image plane I. The refractive index of air "1.00000" is omitted. If the optical surface is aspherical, "*" is attached to the surface number, and the radius of curvature R column indicates a paraxial radius of curvature.

In [Aspherical Data] in each table, a shape for an aspherical surface shown in [Lens Data] is indicated by the following expression (a). Here, X(y) denotes a distance along the optical axis direction from a tangential plane at the vertex of the aspherical surface to a position on the aspherical surface at the height y; R denotes a radius of curvature (paraxial radius of curvature) of the reference spherical surface; κ denotes a conical constant, and Ai denotes an aspherical coefficient in degree i. "E-n" indicates "×10$^{-n}$". For example, 1.234E-05=1.234×10$^{-5}$.

$$X(y) = (y^2/R)/\{1+(1-\kappa \times y^2/R^2)^{1/2}\} + A4 \times y^4 + A6 \times y^6 \tag{a}$$

In [General Data], β is an image capture magnification, f is a focal length of the entire lens system, FNo is an F number, ω is a half angle of view (unit: °), Y is an image height, TL is a total lens length, BF is a distance from an image side surface of an optical element disposed closest to the image to the paraxial image plane, and BF (air conversion) is an air-converted distance from the last optical surface to the paraxial image plane. Here, TL represents an air-converted distance from the last optical surface to the paraxial image plane.

In [Variable Distance Data] in each table, Di is indicated for each of the wide-angle end state, intermediate focal length state, and telephoto end state. Note that Di indicates a variable distance between the i-th surface and the (i+1)th surface.

In [Lens Group Data] in each table, G is a group number, "first surface of group" indicates a surface number of the surface closest to the object in each group, and "focal length of group" indicates a focal length of each group.

In [Conditional Expression] in each table, values corresponding to the above mentioned conditional expressions (1) to (6) are shown.

In all the data values shown below, "mm" is normally used for the unit of focal length f, radius of curvature R, surface distance D and other lengths, unless otherwise specified, but it is not limited to this since an equivalent optical performance is obtained even if an optical system is proportionally expanded or proportionally reduced. The unit is not limited to "mm" and another appropriate unit may be used instead.

The above mentioned description of the tables is the same for all the examples hereinbelow, for which this description is omitted.

Example 1

Example 1 will be described with reference to FIGS. 1 and 2, and Table 1. As FIG. 1 shows, the zoom lens ZL (ZL1) according to Example 1 comprises, in order from an object along the optical axis, a first lens group G1 having positive refractive power, a second lens group G2 having negative refractive power, a third lens group G3 having positive refractive power, a fourth lens group G4 having positive refractive power, and a fifth lens group G5 having positive refractive power.

The first lens group G1 is constituted by a cemented lens of, in order from the object along the optical axis, a negative meniscus lens L11 having a concave surface facing the image and a positive meniscus lens L12 having a convex surface facing the object, and a positive meniscus lens L13 having a convex surface facing the object.

The second lens group G2 is constituted by, in order from the object along the optical axis, a negative meniscus lens L21 having a concave surface facing the image, a negative biconcave lens L22, and a positive biconvex lens L23. The lens surfaces of both sides of the negative lens 21 are formed to be aspherical.

The third lens group G3 is constituted by, in order from the object along the optical axis, a positive biconvex lens L31, a cemented lens of a positive meniscus lens L32 having a convex surface facing the object and a negative meniscus lens L33 having a concave surface facing the image, and a cemented lens of a negative biconcave lens L34 and a positive biconvex lens L35. The lens surfaces of both sides of the positive lens L31 are formed to be aspherical.

The fourth lens group G4 is constituted by a positive meniscus lens L41 having a convex surface facing the object.

The fifth lens group G5 is constituted by a positive meniscus lens L51 having a concave surface facing the object. The lens surface on the image side of the negative lens L51 is formed to be aspherical.

Between the second lens group G2 and the third lens group G3, an aperture stop S for adjusting the quantity of light is disposed. Between the fifth lens group G5 and the image plane I, a low pass filter LPF for cutting off a spatial frequency equal to or greater than a resolution limit of a solid-state image sensor such as CCD disposed on the image plane I.

In the example having this configuration, upon zooming from the wide-angle end state to the telephoto end state, the first lens group G1 moves so as to be closer to the object in the telephoto end state than the wide-angle end state, the second lens group G2 moves with a convex locus toward the image, the third lens group G3 moves monotonically toward the object, and the fourth lens group G4 moves with a convex locus toward the object. Further, the fifth lens group G5 is always fixed with respect to the image plane I. The aperture stop S moves together with the third lens group G3.

Table 1 shows each data of Example 1. The surface numbers 1 to 28 in Table 1 correspond to the optical surfaces of the radii of curvature R1 to R28 shown in FIG. 1, respectively. In Example 1, the sixth surface, the seventh surface, the thirteenth surface, the fourteenth surface and the twenty fourth surface are formed to be aspherical.

TABLE 1

[Lens Data]

| Surface Number | R | D | nd | vd |
|---|---|---|---|---|
| Object Plane | ∞ | | | |
| 1 | 40.0406 | 1.00 | 1.84666 | 23.8 |
| 2 | 28.1663 | 3.20 | 1.60300 | 65.4 |
| 3 | 95.7899 | 0.10 | | |
| 4 | 27.9170 | 2.80 | 1.59319 | 67.9 |
| 5 | 95.7810 | D5 (Variable) | | |
| *6 (Aspherical) | 48.2050 | 1.10 | 1.85135 | 40.1 |
| *7 (Aspherical) | 5.9983 | 5.20 | | |
| 8 | −18.5000 | 0.90 | 1.60300 | 65.4 |
| 9 | 59.7963 | 0.10 | | |
| 10 | 20.4465 | 1.90 | 1.92286 | 20.9 |
| 11 | −459.9230 | D11 (Variable) | | |
| 12 (Stop S) | ∞ | 0.70 | | |
| *13 (Aspherical) | 10.1948 | 2.55 | 1.69350 | 53.2 |
| *14 (Aspherical) | −35.4141 | 0.50 | | |
| 15 | 9.1807 | 2.00 | 1.60000 | 65.4 |
| 16 | 132.3288 | 0.60 | 1.74951 | 35.3 |
| 17 | 6.8378 | 1.35 | | |
| 18 | −31.9343 | 0.60 | 1.74951 | 35.3 |
| 19 | 7.5503 | 2.60 | 1.48749 | 70.3 |
| 20 | −10.2389 | D20 (Variable) | | |
| 21 | 13.7079 | 2.10 | 1.49782 | 82.6 |
| 22 | 104.3223 | D22 (Variable) | | |
| 23 | −167.6500 | 1.20 | 1.53153 | 56.0 |

TABLE 1-continued

| | | | | |
|---|---|---|---|---|
| *24 (Aspherical) | −33.3219 | 0.50 | | |
| 25 | ∞ | 0.50 | 1.51680 | 63.9 |
| 26 | ∞ | 0.50 | | |
| 27 | ∞ | 0.50 | 1.51680 | 63.9 |
| 28 | ∞ | BF | | |
| Image Plane | ∞ | | | |

[Aspherical Data]

Sixth Surface $\kappa = 1.0000, A4 = -7.104E-05, A6 = 2.104E-07$

Seventh Surface $\kappa = 0.3441, A4 = 8.035E-05, A6 = 0.000E+00$

Thirteenth Surface $\kappa = 0.9724, A4 = -7.996E-05, A6 = 0.000E+00$

Fourteenth Surface $\kappa = 1.0000, A4 = 1.092E-04, A6 = 0.0000E+00$

Twenty Fourth Surface $\kappa = 1.0000, A4 = 3.729E-04, A6 = -7.079E-06$

[General Data]

| | Wide-Angle End | Intermediate | Telephoto End |
|---|---|---|---|
| f | 6.17 | 16.00 | 41.54 |
| Aperture Stop Diameter | 9.2 | 7.3 | 7.3 |
| Fno | 2.0 | 3.1 | 4.1 |
| ω | 39.7 | 16.4 | 6.5 |
| BF | 0.357 | 0.357 | 0.357 |
| BF (Air Conversion) | 2.016 | 2.016 | 2.016 |

[Variable Distance Data]

| | | | |
|---|---|---|---|
| f | 6.17 | 16.00 | 41.54 |
| D5 | 0.46 | 10.95 | 21.98 |
| D11 | 19.07 | 5.98 | 2.02 |
| D20 | 3.70 | 5.51 | 19.07 |
| D22 | 5.53 | 10.09 | 5.77 |

[Lens Group Data]

| Group Number | First Surface of Group | Focal Length of Group |
|---|---|---|
| G1 | 1 | 46.9 |
| G2 | 6 | −9.0 |
| G3 | 13 | 15.6 |
| G4 | 21 | 31.5 |
| G5 | 23 | 78.0 |

[Conditional Expressions]

Conditional Expression (1) $\beta 2t \cdot \beta 3w/(\beta 2w \cdot \beta 3t) = 1.18$
Conditional Expression (2) $\beta 2t \cdot \beta 3t/(\beta 2w \cdot \beta 3w) = 6.80$
Conditional Expression (3) $f3/f3L = 0.09$
Conditional Expression (4) $(R2 + R1)/(R2 - R1) = 0.65$
Conditional Expression (5) $f22/f21 = 2.86$
Conditional Expression (6) $\beta 5 = 0.98$ As shown in Table 1, the zoom lens ZL1 according to this example satisfies all the conditional expressions (1) to (6).

FIGS. 2A to 2C are graphs showing various aberrations (spherical aberration, astigmatism, distortion, lateral chromatic aberration, and coma aberration) according to Example 1, where FIG. 2A shows graphs showing various aberrations upon focusing on infinity in the wide-angle end state, FIG. 2B shows graphs showing various aberrations upon focusing on infinity in the intermediate focal length state, and FIG. 2C shows graphs showing various aberrations upon focusing on infinity in the telephoto end state.

In each graph showing aberrations, FNo indicates an F number, and w indicates a half angle of view (unit: °). In each graph showing a spherical aberration, the solid line indicates a spherical aberration, and the broken line indicates a sine condition. In each graph showing astigmatism, the solid line indicates a sagittal image surface, and the broken line indicates a meridional image surface. Each graph showing a coma aberration indicates a meridional coma. d indicates various aberrations at the d-line, g indicates various aberrations at the g-line, and the one with no symbol indicates an aberration at the d-line. The above description on the graphs showing aberrations is the same for other examples, where this description is omitted.

In Example 1, as seen in each graph showing aberrations, various aberrations are corrected well in each focal length state from the wide-angle end state to the telephoto end state, indicating the presence of excellent optical performance.

Example 2

Figure 3:
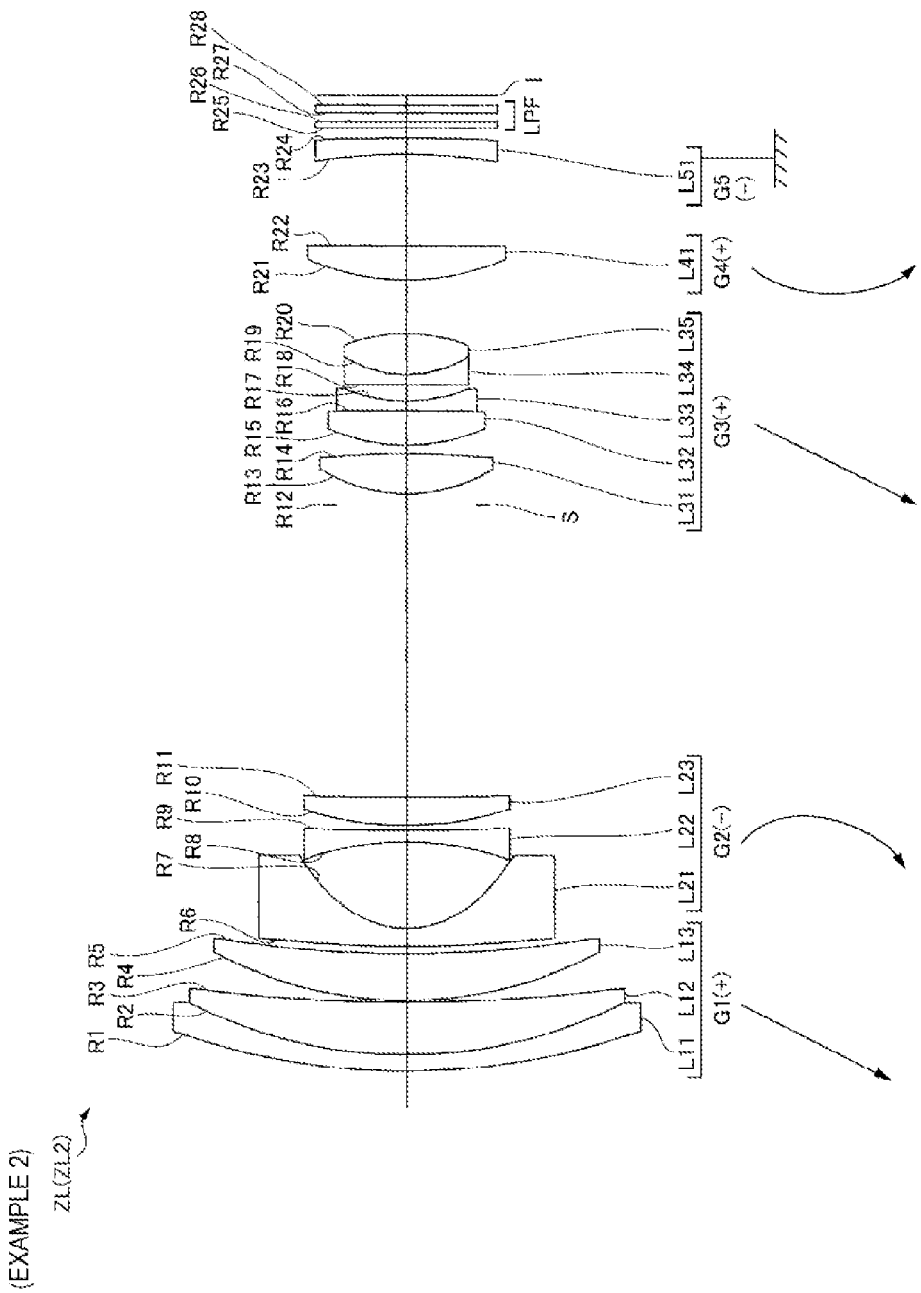
FIG. 3 is a diagram depicting a lens configuration according to Example 2, and a movement locus from a wide-angle end state to a telephoto end state.

Example 2 will be described with reference to FIGS. 3 and 4, and Table 2. As FIG. 3 shows, the zoom lens ZL (ZL2) according to Example 2 comprises, in order from an object along the optical axis, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 is constituted by a cemented lens of, in order from the object along the optical axis, a negative meniscus lens L11 having a concave surface facing the image and a positive meniscus lens L12 having a convex surface facing the object, and a positive meniscus lens L13 having a convex surface facing the object.

The second lens group G2 is constituted by, in order from the object along the optical axis, a negative meniscus lens L21 having a concave surface facing the image, a negative biconcave lens L22, and a positive meniscus lens L23 having a convex surface facing the object. The lens surfaces of both sides of the negative lens 21 are formed to be aspherical.

The third lens group G3 is constituted by, in order from the object along the optical axis, a positive biconvex lens L31, a cemented lens of a positive meniscus lens L32 having a convex surface facing the object and a negative meniscus lens L33 having a concave surface facing the image, and a cemented lens of a negative biconcave lens L34 and a positive biconvex lens L35. The lens surfaces of both sides of the positive lens L31 are formed to be aspherical.

The fourth lens group G4 is constituted by a positive meniscus lens L41 having a convex surface facing the object.

The fifth lens group G5 is constituted by a negative meniscus lens L51 having a concave surface facing the object. The lens surface on the image side of the negative lens L51 is formed to be aspherical.

Between the second lens group G2 and the third lens group G3, an aperture stop S for adjusting the quantity of light is disposed. Between the fifth lens group G5 and the image plane I, a low pass filter LPF for cutting off a spatial frequency equal to or greater than a resolution limit of a solid-state image sensor such as CCD disposed on the image plane I.

In the example having this configuration, upon zooming from the wide-angle end state to the telephoto end state, the first lens group G1 moves so as to be closer to the object in the telephoto end state than the wide-angle end state, the second lens group G2 moves with a convex locus toward the image, the third lens group G3 moves monotonically toward the object, and the fourth lens group G4 moves with a convex locus toward the object. Further, the fifth lens group G5 is always fixed with respect to the image plane I. The aperture stop S moves together with the third lens group G3.

Table 2 shows each data of Example 2. The surface numbers 1 to 28 in Table 2 correspond to the optical surfaces of the radii of curvature R1 to R28 shown in FIG. 3, respectively. In Example 2, the sixth surface, the seventh surface, the thirteenth surface, the fourteenth surface and the twenty fourth surface are formed to be aspherical.

TABLE 2

[Lens Data]

| Surface Number | R | D | nd | vd |
|---|---|---|---|---|
| Object Plane | ∞ | | | |
| 1 | 42.5763 | 1.00 | 1.84666 | 23.80 |
| 2 | 29.1423 | 3.20 | 1.59319 | 67.90 |
| 3 | 100.4970 | 0.10 | | |
| 4 | 24.8831 | 2.85 | 1.60300 | 65.44 |
| 5 | 69.9033 | D5 (Variable) | | |
| *6 (Aspherical) | 58.8322 | 1.10 | 1.80139 | 45.46 |
| *7 (Aspherical) | 5.7793 | 5.20 | | |
| 8 | −19.0000 | 0.70 | 1.60300 | 65.44 |
| 9 | 162.1080 | 0.30 | | |
| 10 | 20.7314 | 1.70 | 1.92286 | 20.88 |
| 11 | 208.7749 | D11 (Variable) | | |
| 12 (Stop S) | ∞ | 0.70 | | |
| *13 (Aspherical) | 9.5179 | 2.45 | 1.69350 | 53.22 |
| *14 (Aspherical) | −38.1787 | 0.50 | | |
| 15 | 11.4039 | 2.10 | 1.48749 | 70.31 |
| 16 | 305.4914 | 0.60 | 1.90265 | 35.73 |
| 17 | 9.7755 | 1.00 | | |
| 18 | 248.7610 | 0.60 | 1.74951 | 35.33 |
| 19 | 6.9238 | 2.50 | 1.48749 | 70.31 |
| 20 | −10.3196 | D20 (Variable) | | |
| 21 | 14.7422 | 2.10 | 1.49782 | 82.57 |
| 22 | 598.6161 | D22 (Variable) | | |
| 23 | −36.5173 | 1.00 | 1.53153 | 55.95 |
| *24 (Aspherical) | −86.2360 | 0.60 | | |
| 25 | ∞ | 0.40 | 1.51680 | 63.88 |
| 26 | ∞ | 0.50 | | |
| 27 | ∞ | 0.50 | 1.51680 | 63.88 |
| 28 | ∞ | BF | | |
| Image Plane | ∞ | | | |

[Aspherical Data]

Sixth Surface

κ = 0.0000, A4 = −4.02E−05, A6 = 8.10E−08, A8 = 0.00E+00, A10 = 0.00E+00

Seventh Surface

κ = −0.656, A4 = −1.10E−05, A6 = 0.000E+00, A8 = 0.000E+00, A10 = −8.34E−10

Thirteenth Surface

κ = −0.506, A4 = −8.67E−05, A6 = 0.000E+00, A8 = 0.000E+00, A10 = 0.000E+00

Fourteenth Surface

κ = 0.011, A4 = 1.42E−04, A6 = 0.000E+00, A8 = 0.000E+00, A10 = 0.000E+00

Twenty Fourth Surface

κ = 0.000, A4 = 1.78E−04, A6 = −5.19E−06, A8 = 0.000E+00, A10 = 0.000E+00

[General Data]

| | Wide-Angle End | Intermediate | Telephoto End |
|---|---|---|---|
| f | 6.17 | 16.10 | 41.56 |
| Aperture Stop Diameter | 8.8 | 7.1 | 7.1 |
| Fno | 2.1 | 3.2 | 4.1 |
| ω | 39.7 | 16.6 | 6.6 |

TABLE 2-continued

| | | | |
|---|---|---|---|
| BF | 0.6 | 0.6 | 0.6 |
| BF (Air Conversion) | 2.292 | 2.292 | 2.292 |

[Variable Distance Data]

| | | | |
|---|---|---|---|
| f | 6.17 | 16.10 | 41.56 |
| D5 | 0.450 | 10.749 | 21.977 |
| D11 | 17.796 | 4.740 | 1.093 |
| D20 | 3.272 | 5.492 | 18.866 |
| D22 | 5.577 | 9.748 | 5.471 |

[Lens Group Data]

| Group Number | First Surface of Group | Focal Length of Group |
|---|---|---|
| G1 | 1 | 47.40 |
| G2 | 6 | −8.95 |
| G3 | 13 | 15.16 |
| G4 | 21 | 29.88 |
| G5 | 23 | −120.00 |

[Conditional Expressions]

| | |
|---|---|
| Conditional Expression (1) | $\beta 2t \cdot \beta 3w/(\beta 2w \cdot \beta 3t) = 1.14$ |
| Conditional Expression (2) | $\beta 2t \cdot \beta 3t/(\beta 2w \cdot \beta 3w) = 6.70$ |
| Conditional Expression (3) | $f3/f3L = 0.15$ |
| Conditional Expression (4) | $(R2 + R1)/(R2 - R1) = 0.92$ |
| Conditional Expression (5) | $f22/f21 = 3.49$ |
| Conditional Expression (6) | $\beta 5 = 1.03$ |

As shown in Table 2, the zoom lens ZL2 according to this example satisfies all the conditional expressions (1) to (6).

Figure 4A:
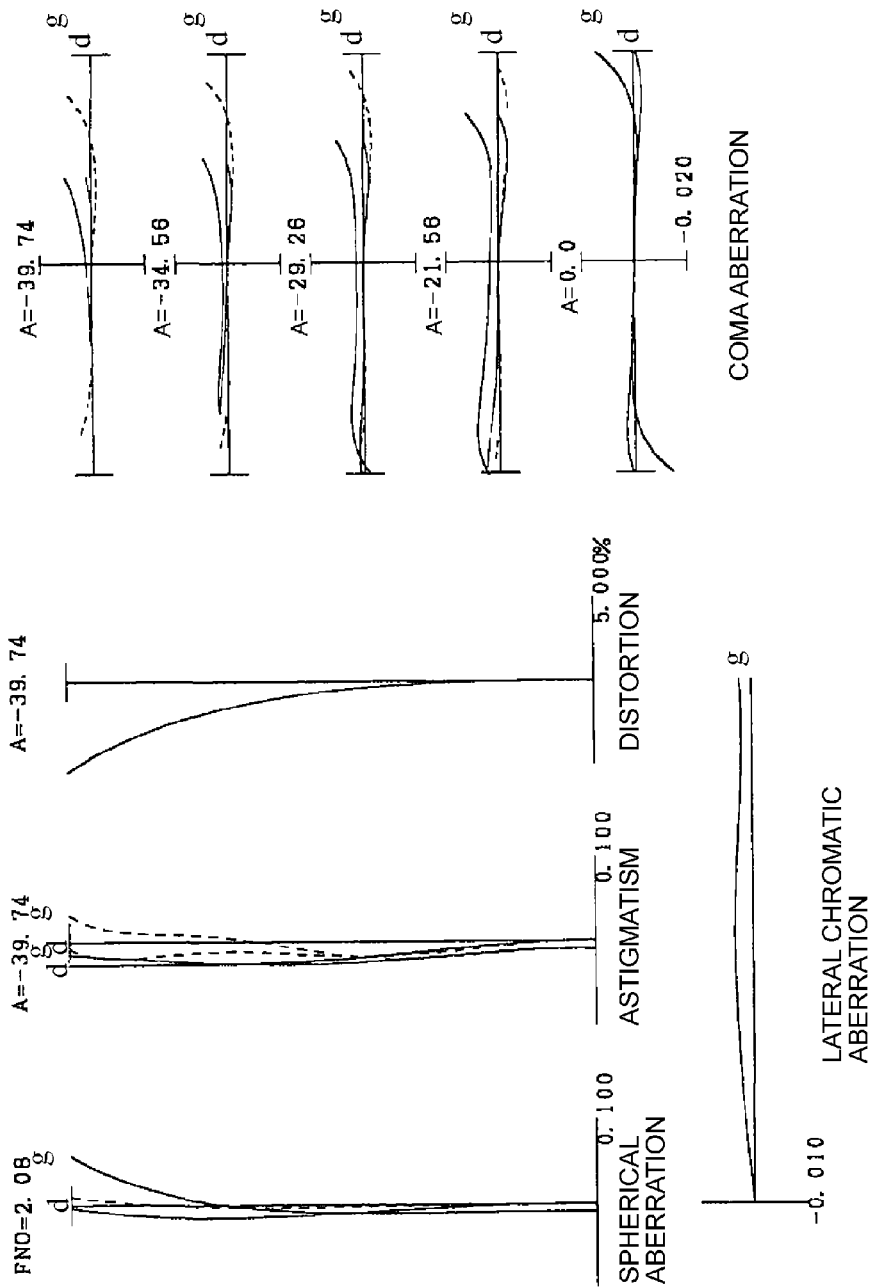
FIGS. 4A to 4C are graphs showing various aberrations of the zoom lens according to Example 2, where
Figure 4B:
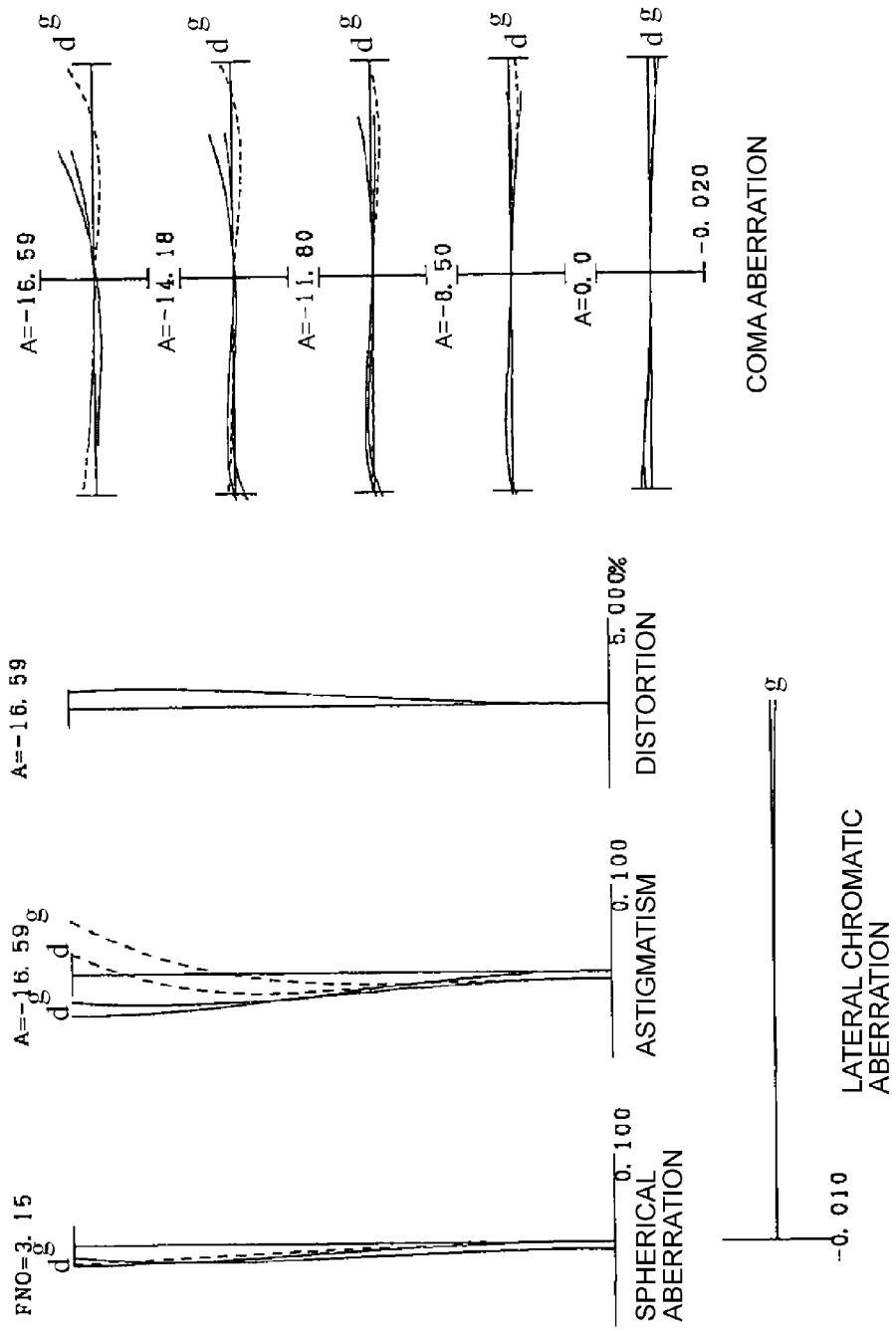
Figure 4C:
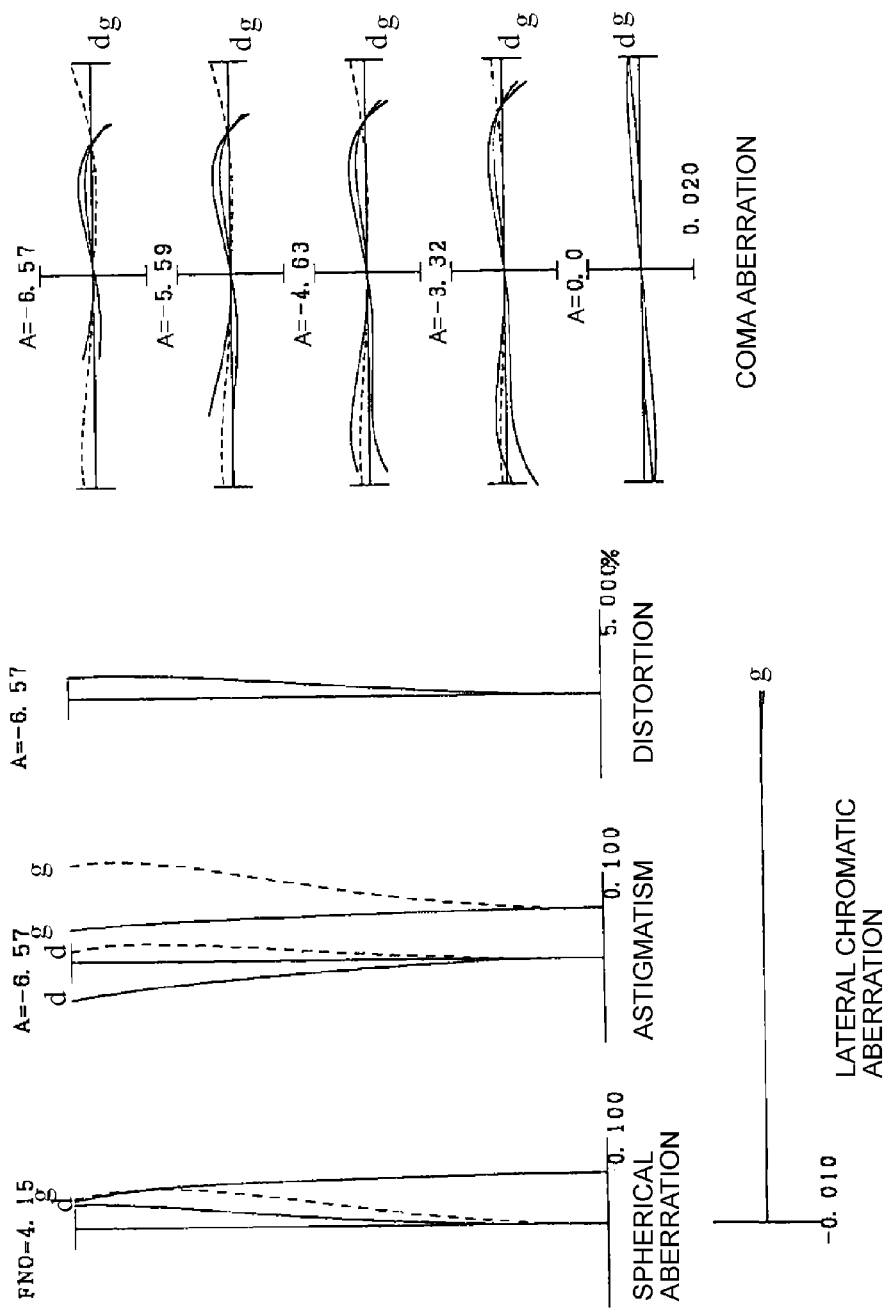

FIGS. 4A to 4C are graphs showing various aberrations (spherical aberration, astigmatism, distortion, lateral chromatic aberration, and coma aberration) according to Example 2, where FIG. 4A shows graphs showing various aberrations upon focusing on infinity in the wide-angle end state, FIG. 4B shows graphs showing various aberrations upon focusing on infinity in the intermediate focal length state, and FIG. 4C shows graphs showing various aberrations upon focusing on infinity in the telephoto end state.

In Example 2, as seen in each graph showing aberrations, various aberrations are corrected well in each focal length state from the wide-angle end state to the telephoto end state, indicating the presence of excellent optical performance.

As described above, according to each example, a zoom lens, which is bright with an F value of about 2, secures a high zoom ratio of six times or more, and provides a high quality image.

In the above embodiment, the following content can be adopted within a range where the optical performance is not diminished.

In each of the examples, a zoom lens constituted by five lens groups was shown, but the present invention can also be applied to a configuration comprising a different number of lens groups, such as six groups. Further, in the configuration, a lens or a lens group may be added to the side closest to the object, or a lens or a lens group may be added to the side closest to the image. A lens group refers to a portion having at least one lens isolated by an air distance which changes upon zooming.

In the zoom lens ZL of the present embodiment, a single or a plurality of lens group(s) or a partial lens group may be designed to be a focusing lens group which performs focusing from an object at infinity to an object at close distance by moving in the optical axis direction. This focusing lens group can be applied to auto focus, and is also suitable for driving a motor for auto focusing (e.g. driving using an ultrasonic motor or the like). It is particularly preferable that the fourth lens group G4 is designed to be the focusing lens group.

In the zoom lens ZL of the present embodiment, a lens group or a partial lens group may be designed to be a vibration-isolating lens group, which corrects image blurs generated by hand motion by vibrating the lens group or the partial lens group in a direction orthogonal to the optical axis, or rotating (oscillating) the lens group or the partial lens group in an in-plane direction including the optical axis. It is particularly preferable that at least a part of the third lens group G3 is designed to be the vibration-isolating lens group.

In the zoom lens ZL of the present embodiment, the lens surface may be formed to be a spherical surface or a plane, or an aspherical surface. If the lens surface is a spherical surface or a plane, then lens processing, assembly and adjustment are easy, and deterioration of optical performance, due to an error in processing, assembly and adjustment, can be prevented, which is desirable. Furthermore, even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite-aspherical surface generated by forming resin on the surface of the glass to be an aspherical shape. The lens surface may be a diffraction surface, and the lens may be a refractive index distributed lens (GRIN lens) or a plastic lens.

In the zoom lens ZL of the present embodiment, it is preferable that the aperture stop S is disposed in or near the third lens group G3, but the role of the aperture stop may be substituted by the frame of the lens, without disposing a separate element as the aperture stop.

In the zoom lens ZL of the present embodiment, each lens surface may be coated by an anti-reflection film which has high transmittance in a wide wavelength range, in order to decrease flares and ghosts, and implement a high optical performance with high contrast.

The zoom ratio of the zoom lens ZL of the present embodiment is about 3 to 10.

Embodiments were described using the configuration requirements in order to assist understanding of the present invention, but needless to say, the present invention is not limited to this embodiment.

EXPLANATION OF NUMERALS AND CHARACTERS

ZL (ZL1, ZL2) zoom lens
CAM digital still camera (optical apparatus)
G1 first lens group
G2 second lens group
G3 third lens group
G4 fourth lens group
G5 fifth lens group
S aperture stop
LPF low pass filter
I image plane

The invention claimed is:
1. A zoom lens comprising, in order from an object along an optical axis: a first lens group having positive refractive power, a second lens group having negative refractive power, a third lens group having positive refractive power, a fourth lens group having positive refractive power, and a fifth lens group,
- the fourth lens group being constituted by one positive lens,
- the fifth lens group being constituted by one lens fixed with respect to an image plane during zooming, and
- the following conditional expression being satisfied:

$$0.9 < \beta 2t \cdot \beta 3w/(\beta 2w \cdot \beta 3t) < 1.7$$

where
- β2w denotes a magnification of the second lens group in a wide-angle end state,
- β3w denotes a magnification of the third lens group in the wide-angle end state,
- β2t denotes a magnification of the second lens group in a telephoto end state, and
- β3t denotes a magnification of the third lens group in the telephoto end state.

2. The zoom lens according to claim 1, wherein the following conditional expression is satisfied:

$$4.0 < \beta 2t \cdot \beta 3t/(\beta 2w \cdot \beta 3w) < 10.0.$$

3. The zoom lens according to claim 1, wherein the third lens group comprises, in order from the object along the optical axis, a single lens having positive refractive power, a first cemented lens having negative refractive power, and a second cemented lens.

4. The zoom lens according to claim 3, wherein the following conditional expression is satisfied:

$$-0.4 < f3/f3L < 0.4$$

where
- f3 denotes a focal length of the third lens group, and
- f3L denotes a focal length of the second cemented lens of the third lens group.

5. The zoom lens according to claim 3, wherein the following conditional expression is satisfied:

$$0.0 < (R2+R1)/(R2-R1) < 1.5$$

where
- R1 denotes a radius of curvature of a lens surface closest to the image in the first cemented lens of the third lens group, and
- R2 denotes a radius of curvature of a lens surface closest to the object in the second cemented lens of the third lens group.

6. A zoom lens according to claim 1, wherein the second lens group comprises, in order from the object, a first negative lens and a second negative lens, and the following conditional expression is satisfied:

$$1.2 < f22/f21 < 5.0$$

where
- f21 denotes a focal length of the first negative lens of the second lens group, and
- f22 denotes a focal length of the second negative lens of the second lens group.

7. The zoom lens according to claim 1, wherein the following conditional expression is satisfied:

$$0.85 < \beta 5 < 1.15$$

where
- β5 denotes a magnification of the fifth lens group.

8. The zoom lens according to claim 1, wherein the fifth lens group is constituted by a plastic lens.

9. The zoom lens according to claim 1, wherein, upon zooming from the wide-angle end state to the telephoto end state, the first lens group moves so as to be closer to the object in the telephoto end state than in the wide-angle end state, the second lens group moves with a convex locus toward the image, the third lens group moves toward the object, and the fourth lens group moves with a convex locus toward the object.

10. An optical apparatus comprising a zoom lens according to claim 1.

11. A method of manufacturing a zoom lens having, in order from an object along an optical axis: a first lens group having positive refractive power, a second lens group having negative refractive power, a third lens group having positive refractive power, a fourth lens group having positive refractive power, and a fifth lens group, the method comprising:
- assembling each lens group in a lens barrel such that:
- the fourth lens group is constituted by one positive lens,
- the fifth lens group is constituted by one lens fixed with respect to an image plane during zooming, and
- the following conditional expression is satisfied:

$$0.9 < \beta 2t \cdot \beta 3w/(\beta 2w \cdot \beta 3t) < 1.7$$

where
- β2w denotes a magnification of the second lens group in a wide-angle end state,
- β3w denotes a magnification of the third lens group in the wide-angle end state,
- β2t denotes a magnification of the second lens group in a telephoto end state, and
- β3t denotes a magnification of the third lens group in the telephoto end state.

* * * * *